United States Patent
Usui

(10) Patent No.: US 8,542,404 B2
(45) Date of Patent: Sep. 24, 2013

(54) IMAGE FORMING APPARATUS, IMAGE FORMING APPARATUS CONTROL METHOD, AND STORAGE MEDIUM STORING PROGRAM

(75) Inventor: Keiko Usui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/046,952

(22) Filed: Mar. 14, 2011

(65) Prior Publication Data

US 2011/0242558 A1   Oct. 6, 2011

(30) Foreign Application Priority Data

Mar. 30, 2010   (JP) ................................. 2010-079441

(51) Int. Cl.
- *H04N 1/60* (2006.01)
- *H04N 1/00* (2006.01)
- *G06K 15/00* (2006.01)
- *G09G 5/00* (2006.01)
- *G06F 17/00* (2006.01)

(52) U.S. Cl.
USPC ............ 358/1.9; 358/1.6; 358/1.18; 345/581; 345/619; 715/274

(58) Field of Classification Search
USPC .................. 358/1.9, 1.6, 1.18; 345/581, 619; 715/274
See application file for complete search history.

(56) References Cited

U.S. PATENT DOCUMENTS

| | | | |
|---|---|---|---|
| 2005/0073726 A1 | 4/2005 | Nobuta et al. | |
| 2005/0206973 A1* | 9/2005 | Shoji et al. | 358/500 |
| 2007/0211296 A1* | 9/2007 | Toda | 358/1.18 |
| 2009/0231353 A1* | 9/2009 | Han | 345/581 |

FOREIGN PATENT DOCUMENTS

| | | |
|---|---|---|
| JP | 08-186677 A | 7/1996 |
| JP | 2005-269203 A | 9/2005 |

\* cited by examiner

*Primary Examiner* — Charlotte M Baker

(74) *Attorney, Agent, or Firm* — Fitzpatrick, Cella, Harper & Scinto

(57) ABSTRACT

An image forming apparatus acquires information indicating each of a plurality of profiles, selects one profile based on the pieces of information, and transmits, to an information processing apparatus, identification information for identifying the selected profile. The image forming apparatus receives, from the information processing apparatus, an image reading instruction complying with a setting for reading an image, included in the profile identified based on the identification information. The image forming apparatus determines whether a setting indicated by the received instruction and a setting for reading the image, included in one selected profile correspond to each other. When it is determined that the settings do not correspond to each other, the image forming apparatus reads the image to generate image data in accordance with the setting for reading the image, included in one selected profile.

11 Claims, 12 Drawing Sheets

F I G. 3D
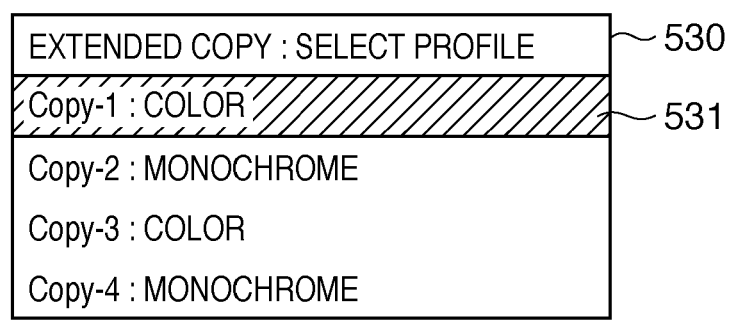
F I G. 3E
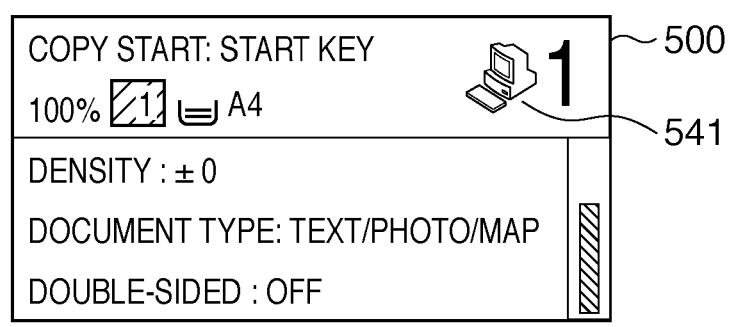

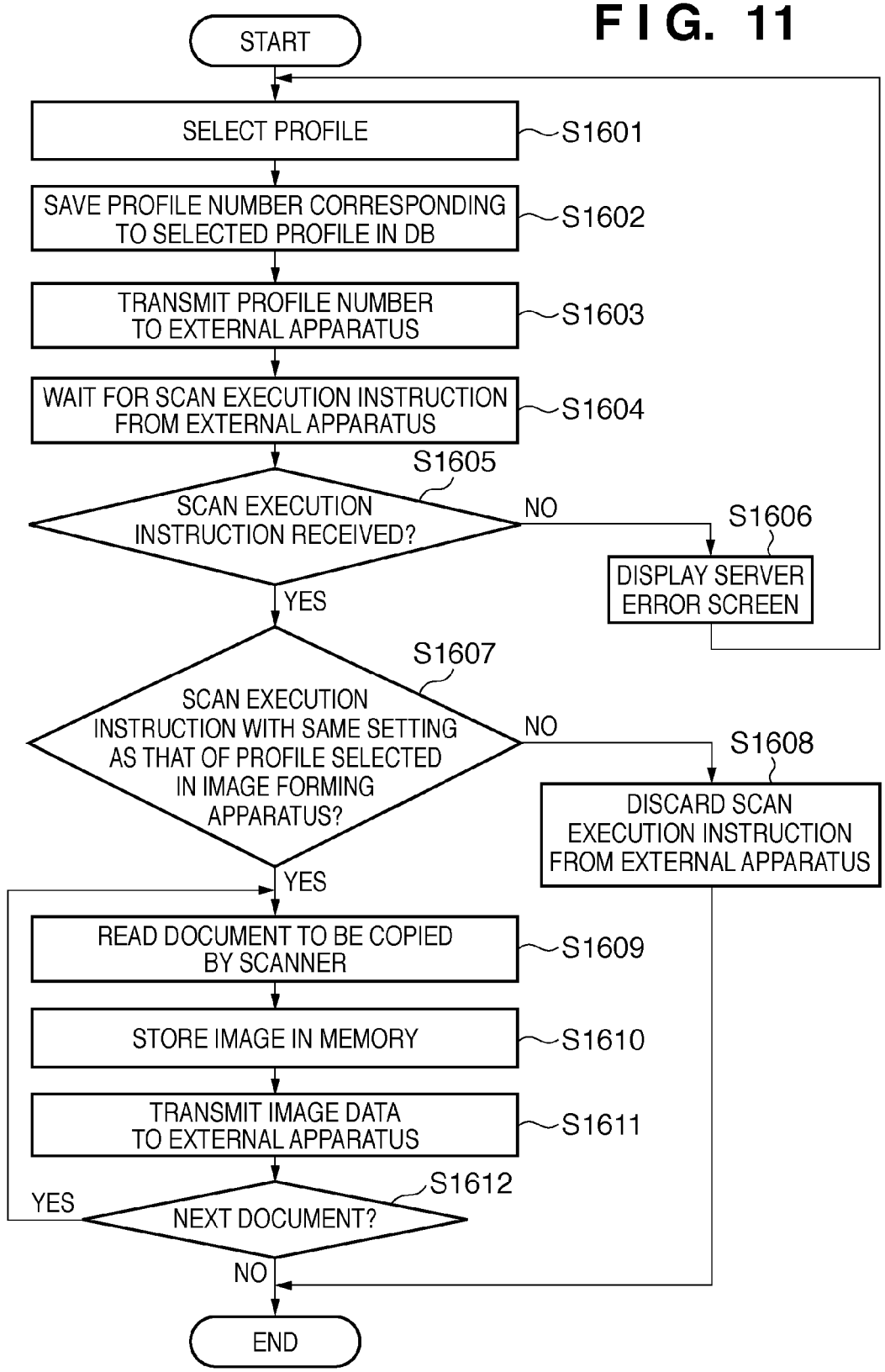

US 8,542,404 B2

IMAGE FORMING APPARATUS, IMAGE FORMING APPARATUS CONTROL METHOD, AND STORAGE MEDIUM STORING PROGRAM

BACKGROUND OF THE INVENTION

1. Field of the Invention

The present invention relates to an image forming apparatus, an image forming apparatus control method for reading an image to acquire image data, and a storage medium storing a program.

2. Description of the Related Art

Conventionally, cooperative performance of processing by an image forming apparatus and an external apparatus such as a PC has been implemented widely. The overall function cannot be achieved provided by a single image forming apparatus.

Japanese Patent Laid-Open No. 8-186677 discloses an image forming apparatus using a pseudo push scan function. This function can simplify the arrangement of the image forming apparatus, providing the apparatus at low cost. In Japanese Patent Laid-Open No. 8-186677, the user selects a host PC name and PC-side scan parameter set (to be referred to as a profile) from choices representing host PC names and profiles displayed on the panel of the image forming apparatus. The user then transmits scanned image data to the host PC. The host PC performs image processing for the received image data based on an image processing method designated by a pull scan driver, and stores the resultant image data in a predetermined storage destination.

In addition to this pseudo push scan function, an extended copy function is implemented by cooperation between an image forming apparatus and an external apparatus such as a host PC, similar to the pseudo push scan function.

To implement the extended copy function, a dedicated driver capable of setting a profile is installed in the external apparatus, similar to the pseudo push scan function. In some cases, profile settings on the image forming apparatus side are different from those set by the driver on the external apparatus side. When the user sets a profile using the driver on the external apparatus side, the external apparatus functions predominantly and thus scanning is executed by giving priority to the profile on the external apparatus side.

This will be explained by exemplifying the color mode. The user can set the color mode when setting a profile. After setting the profile, the image forming apparatus is notified of the profile by polling, and registers the profile in the database of the image forming apparatus. The user checks a list of profiles on the image forming apparatus and selects a profile.

However, if the driver unintentionally rewrites the profile settings on the external apparatus side, the profile settings then differ from those registered in the image forming apparatus, outputting a scan result the user does not wants.

Japanese Patent Laid-Open No. 2005-269203 discloses a technique of transmitting scan data as monochrome data to an external apparatus regardless of a monochrome (black and white)/color mode key operation. The technique in Japanese Patent Laid-Open No. 2005-269203 aims to execute scanning in accordance with profile settings in an image forming apparatus, but cannot solve the above-described problem that the profile settings differ from those in the external apparatus.

SUMMARY OF THE INVENTION

An aspect of the present invention is to eliminate the above-mentioned problems with the conventional technology. The present invention provides an image forming apparatus and image forming apparatus control method for preventing execution not intended by the user in execution of a function which is operated cooperatively by an external apparatus and image forming apparatus, and a storage medium storing a program.

The present invention in its first aspect provides an image forming apparatus which is capable of connecting to an information processing apparatus that has a database for storing a plurality of profiles each including a setting for reading an image and can change the settings for reading the image, included in the profiles, and which reads an image to generate image data, the image forming apparatus comprising: a first storage unit configured to acquire and store information indicating each of the plurality of profiles; a selection unit configured to select one profile based on the information stored in the first storage unit; a first transmission unit configured to transmit, to the information processing apparatus, identification information for identifying the profile selected by the selection unit; a reception unit configured to receive, from the information processing apparatus, a reading instruction for the image that complies with the setting for reading the image, included in the profile identified based on the identification information; a determination unit configured to determine whether a setting indicated by the instruction received by the reception unit and a setting for reading the image that is included in the one profile selected by the selection unit correspond to each other; and a reading unit configured to, when the determination unit determines that both settings do not correspond to each other, read the image to generate image data in accordance with the setting for reading the image, included in the one profile selected by the selection unit.

The present invention in its second aspect provides an image forming apparatus which is capable of connecting to an information processing apparatus that has a database for storing a plurality of profiles each including a setting for reading an image and can change the settings for reading the image, included in the profiles, and which reads an image to generate image data, the image forming apparatus comprising: a first storage unit configured to acquire and store information indicating each of the plurality of profiles; a selection unit configured to select one profile based on the information stored in the first storage unit; a first transmission unit configured to transmit, to the information processing apparatus, identification information for identifying the profile selected by the selection unit; a reception unit configured to receive, from the information processing apparatus, a reading instruction for the image that complies with the setting for reading the image, included in the profile identified based on the identification information; a determination unit configured to determine whether a setting indicated by the instruction received by the reception unit and a setting for reading the image, included in the one profile selected by the selection unit correspond to each other; and a display unit configured to, when the determination unit determines that both settings do not correspond to each other, displays a message that the setting indicated by the instruction received by the reception unit and the setting for reading the image, included in the one profile selected by the selection unit do not correspond to each other.

The present invention in its third aspect provides an image forming apparatus control method executed in an image forming apparatus which is capable of connecting to an information processing apparatus that has a database for storing a plurality of profiles each including a setting for reading an image and can change the settings for reading the image, included in the profiles, and which reads an image to generate image data, the method comprising: a first storage step of acquiring and storing the information indicating each of the plurality of profiles; a selection step of selecting one profile based on the information stored in the first storage step; a first transmission step of transmitting, to the information processing apparatus, identification information for identifying the profile selected in the selection step; a reception step of receiving, from the information processing apparatus, a reading instruction for the image that complies with the setting for reading the image, included in the profile identified based on the identification information; a determination step of determining whether a setting indicated by the instruction received in the reception step and a setting for reading the image, included in the one profile selected in the selection step correspond to each other; and a reading step of, when both settings are determined in the determination step not to correspond to each other, reading the image to generate image data in accordance with the setting for reading the image, included in the one profile selected in the selection step.

The present invention in its fourth aspect provides an image forming apparatus control method executed in an image forming apparatus which is capable of connecting to an information processing apparatus that has a database for storing a plurality of profiles each including a setting for reading an image and can change the settings for reading the image, included in the profiles, and which reads an image to generate image data, the method comprising: a first storage step of acquiring and storing information indicating each of the plurality of profiles; a selection step of selecting one profile based on the information stored in the first storage step; a first transmission step of causing a first transmission unit of the image forming apparatus to transmit, to the information processing apparatus, identification information for identifying the profile selected in the selection step; a reception step of receiving, from the information processing apparatus, a reading instruction for the image that complies with the setting for reading the image, included in the profile identified based on the identification information; a determination step of determining whether a setting indicated by the instruction received in the reception step and a setting for reading the image, included in the one profile selected in the selection step correspond to each other; and a display step of, when both settings are determined in the determination step not to correspond to each other, displaying a message that the setting indicated by the instruction received in the reception step and the setting for reading the image, included in the one profile selected in the selection step do not correspond to each other.

The present invention in its fifth aspect provides a non-transitory computer-readable storage medium storing a program for causing a computer capable of connecting to an information processing apparatus that has a database for storing a plurality of profiles each including a setting for reading an image and can change the settings for reading the image, included in the profiles, to function to acquire and store information indicating each of the plurality of profiles; select one profile based on the stored information; transmit, to the information processing apparatus, identification information for identifying the selected profile; receive, from the information processing apparatus, a reading instruction for the image that complies with the setting for reading the image, included in the profile identified based on the identification information; determine whether a setting indicated by the received instruction and a setting for reading the image, included in the one selected profile correspond to each other; and when both settings are determined not to correspond to each other, change the setting indicated by the received instruction to the setting for reading the image, included in the one selected profile.

The present invention in its sixth aspect provides a non-transitory computer-readable storage medium storing a program for causing a computer capable of connecting to an information processing apparatus that has a database for storing a plurality of profiles each including a setting for reading an image and can change the settings for reading the image, included in the profiles, to function to acquire and store information indicating each of the plurality of profiles; select one profile based on the stored information; transmit, to the information processing apparatus, identification information for identifying the selected profile; receive, from the information processing apparatus, a reading instruction for the image that complies with the setting for reading the image, included in the profile identified based on the identification information; determine whether a setting indicated by the received instruction and a setting for reading the image, included in the one selected profile correspond to each other; and when both settings are determined not to correspond to each other, display a message that the setting indicated by the received instruction and the setting for reading the image, included in the one selected profile do not correspond to each other.

The present invention can prevent execution of a function not intended by the user, which is operated cooperatively by an external apparatus and image forming apparatus.

Further features of the present invention will become apparent from the following description of exemplary embodiments with reference to the attached drawings.

BRIEF DESCRIPTION OF THE DRAWINGS

FIGS. 3A to 3E are views each exemplifying a screen displayed on the display unit of the operation unit;

FIG. 11 is a flowchart showing another processing until image data is transmitted after a profile is selected.

DESCRIPTION OF THE EMBODIMENTS

Figure 1:
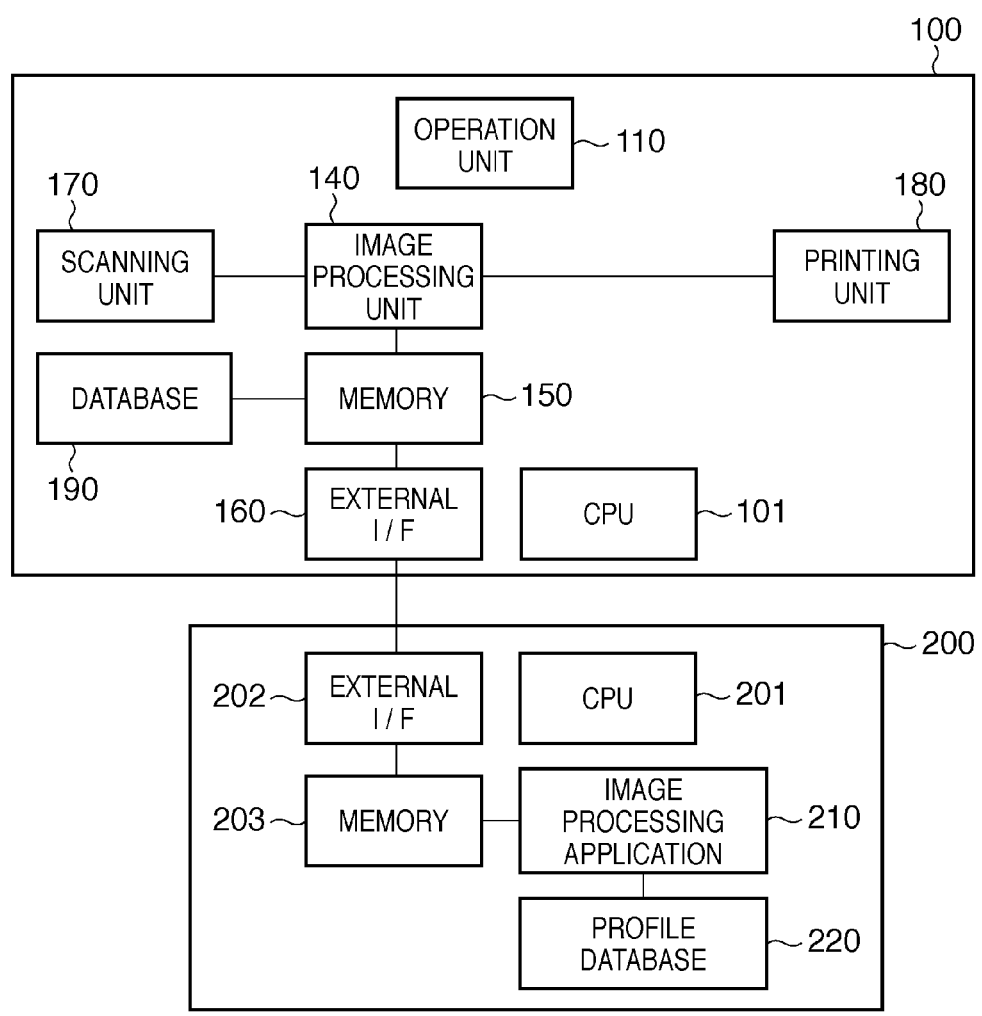
FIG. 1 is a block diagram showing the configuration of an image forming system including an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

[First Embodiment]

FIG. 1 is a block diagram showing the configuration of an image forming system including an image forming apparatus according to the first embodiment of the present invention. An image forming apparatus 100 is, for example, a copying machine. A CPU 101 controls blocks (to be described later) within the image forming apparatus 100. An operation unit 110 accepts a user instruction. A scanning unit 170 reads a document to acquire scanned image data. An image processing unit 140 performs image processing for the scanned image data. A memory 150 stores image data having undergone image processing by the image processing unit 140, and its attribute data. An external I/F 160 is an interface for communicating with an external apparatus 200. For example, the external I/F 160 transmits, to the external apparatus 200, image data and its attribute data which are stored in the memory 150. A printing unit 180 performs print processing for image data stored in the memory 150. If necessary, the image data undergoes print processing after image processing by the image processing unit 140. A database 190 stores a profile acquired from the external apparatus 200 by polling (example of the first storage). In FIG. 1, the scanning unit 170 and printing unit 180 are shown as building components within the image forming apparatus 100, but either or both of them may be external units.

The external apparatus 200 is an information processing apparatus such as a PC, and includes a CPU 201. The CPU 201 controls blocks (to be described later) within the external apparatus 200. An external I/F 202 is an interface for communicating with another apparatus. A memory 203 stores image data to be transmitted/received via the external I/F 202. An image processing application 210 performs image processing for image data in accordance with the settings of a profile stored in a profile database 220. The external apparatus 200 transmits image data having undergone image processing to the image forming apparatus 100 via the external I/F 202. The profile database 220 stores a plurality of profiles, each of which sets what kind of image processing is to be done.

In the first embodiment, the image forming apparatus 100 and external apparatus 200 as shown in FIG. 1 cooperatively operate to execute the extended copy function. To execute the extended copy function, a dedicated driver is installed in the external apparatus 200. The dedicated driver installed in the external apparatus 200 allows changing, for example, various settings in scanning. In this case, the extended copy function means the following function. First, the external apparatus 200 transmits a scan execution instruction to the image forming apparatus 100, and the image forming apparatus 100 executes scanning. The image forming apparatus 100 then transmits the scanned image data to the external apparatus 200, and the external apparatus 200 stores it. Further, the external apparatus 200 transmits the image data having undergone image processing to the image forming apparatus 100, and the image forming apparatus 100 performs print processing.

Figure 2:
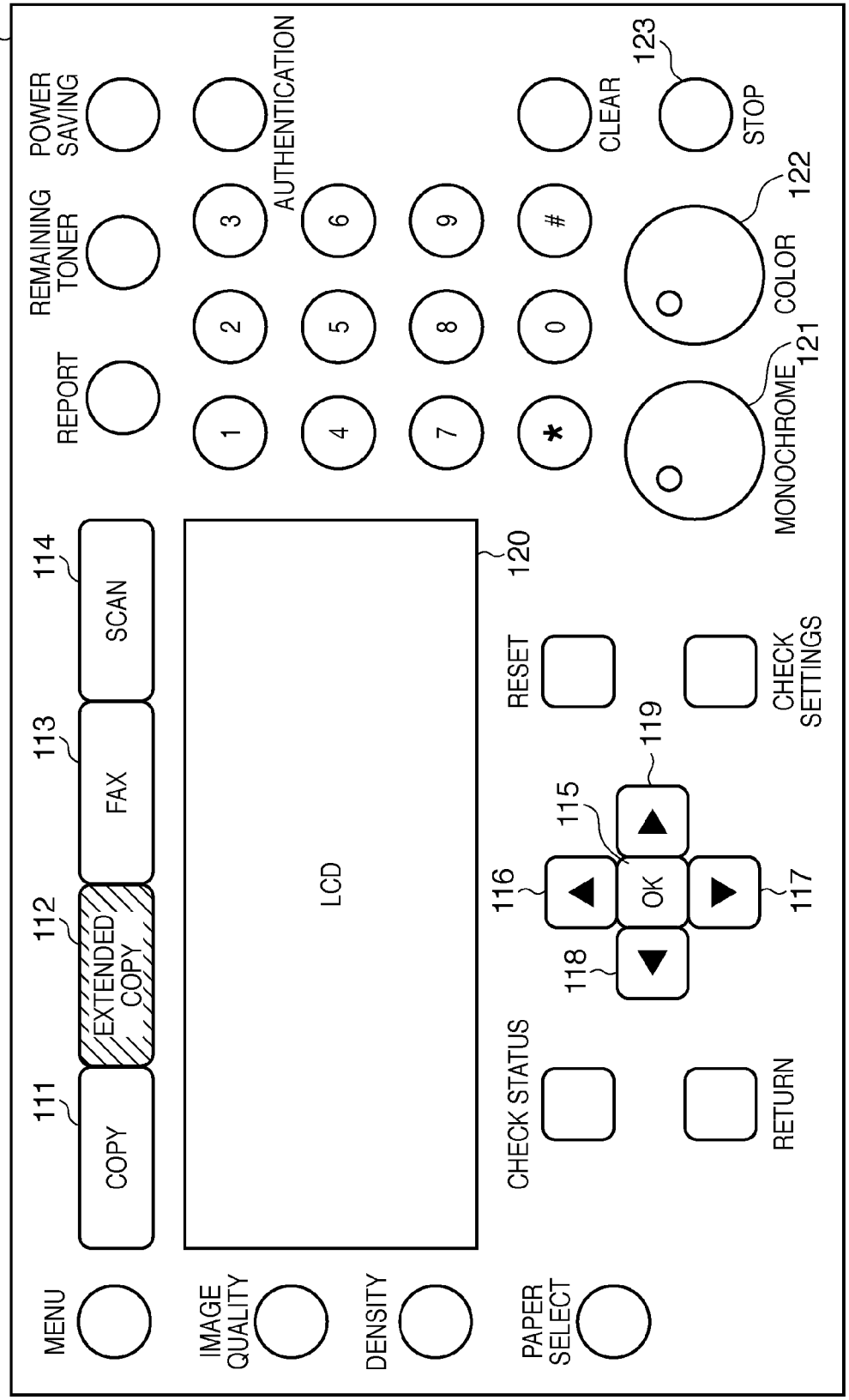
FIG. 2 is a view exemplifying an operation unit.

FIG. 2 is a view exemplifying the operation unit 110 of the image forming apparatus 100. Keys 111, 112, 113, and 114 are function keys for designating job execution of the copy function, extended copy function, facsimile function, and scan function, respectively. When the user presses one of these keys, the screen shifts to the basic setting screen of the corresponding function. When the user selects a function key, the display is highlighted. For example, in FIG. 2, the display of "extended copy" is highlighted to indicate that job execution of the function is designated. An OK key 115 is used to select and finalize an item. Keys 116, 117, 118, and 119 are up, down, left, and right arrow keys, and are used to move the item. A display unit 120 is, for example, an LCD, and displays an operation screen such as a basic setting screen. A key 121 is used to start execution in the black and white mode (to be also referred to as a monochrome mode), and lighting it indicates that the key 121 can be pressed. Similarly, a key 122 is used to start execution in the color mode, and lighting it indicates that the key 122 can be pressed. The user can start executing a job of the extended copy function described in the embodiment by pressing the key 121 or 122. A key 123 is used to stop a job which has started.

Figure 3A:
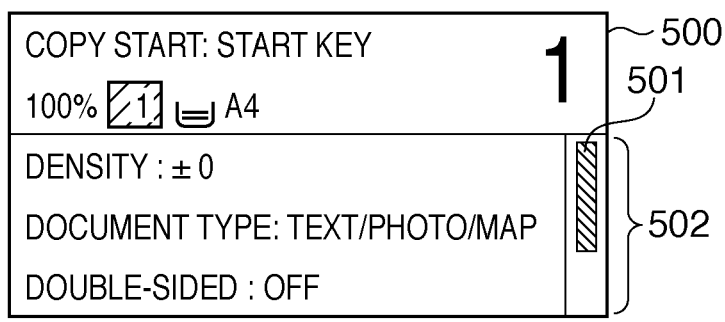

FIGS. 3A to 3E are views each exemplifying a screen displayed on the display unit 120 of the operation unit 110 of the image forming apparatus 100. FIG. 3A is a view showing a screen displayed when the user presses the key 112 indicating the extended copy function. A screen 500 is a basic setting screen for the extended copy function. The display is formed from five lines, and the first line displays the current state. The second line displays the copy ratio and selected paper feed source information. The number of copies is displayed large numerically at the right end of the first and second lines. The third to fifth lines display operation mode items 502 which can be designated in the copy function. If all items are not displayed, the user can scroll the screen using a scroll bar 501.

Figure 3B:
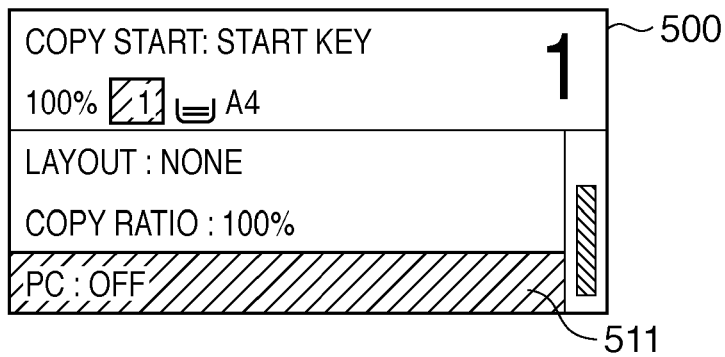

FIG. 3B is a view showing a PC connection setting item displayed by scrolling down the screen shown in FIG. 3A. In the embodiment, a PC connection setting "shown as (PC: OFF)" item 511 may be set in the operation mode items in response to pressing not the key 112 but the key 111 which designates job execution of the copy function. When the user presses the OK key 115 in the screen shown in FIG. 3B, the screen shifts to a detailed setting screen for the extended copy function shown in FIG. 3C.

Figure 3C:
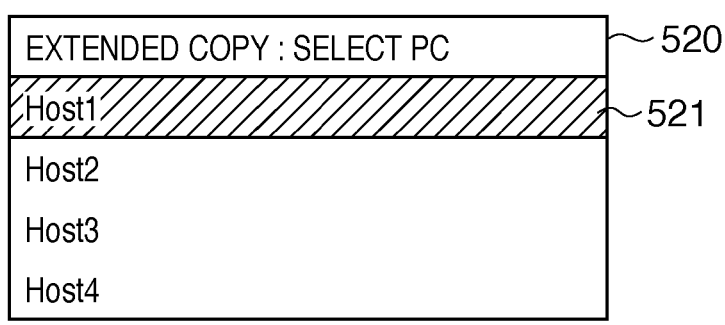

FIG. 3C is a view exemplifying a detailed setting screen for the extended copy function. A screen 520 displays a screen for selecting an external apparatus 200 such as a PC to be used in execution of the extended copy function. An item may be highlighted to show details such as 521.

FIG. 3D shows a screen representing a list of all profiles corresponding to the external apparatus 200 selected in FIG. 3C. As represented by an item 531 of a screen 530, each profile name and a mode setting (monochrome/color) set in the profile are displayed as the contents of the list. Alternatively, when each item is selected, the mode setting may be displayed not as the item 531 but by turning on the LED of the key 121 for starting job execution in the monochrome mode or that of the key 122 for starting job execution in the color mode.

FIG. 3E is a view showing a basic setting screen for the extended copy function displayed when the settings in FIGS. 3B to 3D are made. As shown in FIG. 3E, a connected external apparatus icon 541 is displayed.

Figure 4A:
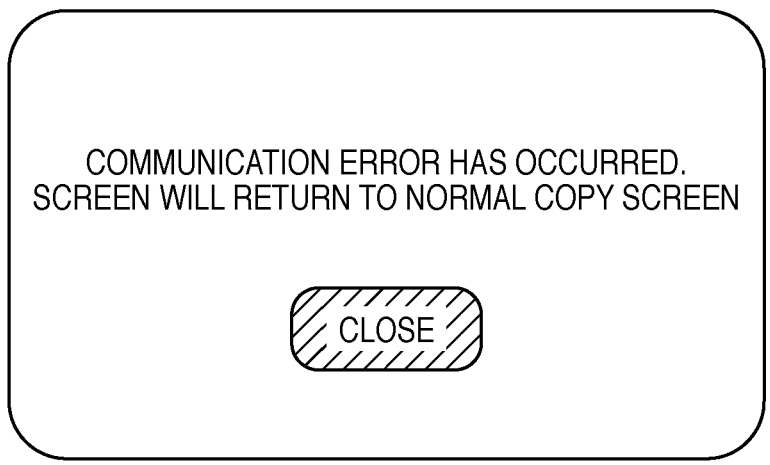
FIGS. 4A and 4B are views each exemplifying an error screen.
Figure 4B:
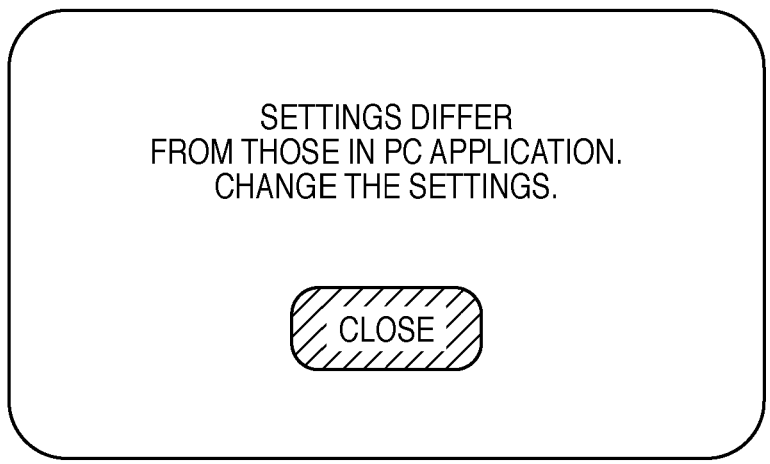

FIGS. 4A and 4B are views each exemplifying an error screen displayed when the settings in FIGS. 3B to 3D are made. FIG. 4A shows an error screen displayed when the external apparatus 200 is selected and is subsequently determined that the external apparatus 200 cannot be accessed. When the user presses the OK key 115 in this screen, a screen (not shown) corresponding to pressing of the key 111 indicating the normal copy function appears.

FIG. 4B shows an error screen displayed when a mode setting (monochrome/color) set in a profile selected by the image forming apparatus 100 differs from a mode (monochrome/color) set in a scan execution instruction from the external apparatus 200. When the user presses the OK key 115 in this screen, a screen corresponding to pressing of the key 111 indicating the normal copy function appears.

Figure 5:
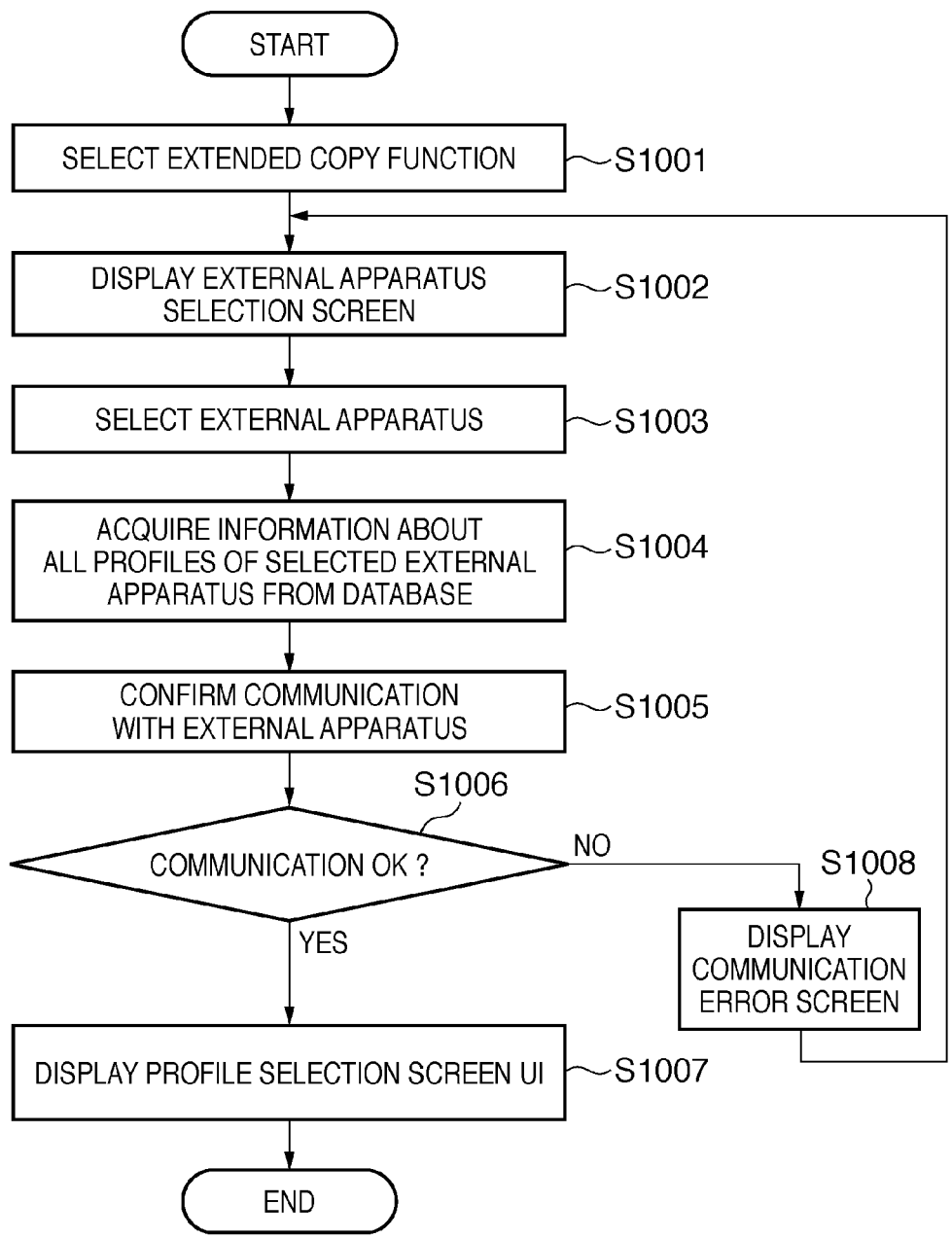
FIG. 5 is a flowchart showing an operation until the image forming apparatus displays a profile selection screen.

FIG. 5 is a flowchart showing an operation sequence until the profile selection screen is displayed after the user selects the extended copy function in the image forming apparatus 100. For example, the CPU 101 of the image forming apparatus 100 executes processing shown in this flowchart. First in step S1001, after power-on of the image forming apparatus 100, the user selects the PC connection setting item 511 by pressing the OK key 115 from the basic setting screen (FIG. 3B) for the extended copy function that appears in response to pressing the key 112. In step S1002, the image forming apparatus 100 displays the screen 520 shown in FIG. 3C to select the external apparatus 200. The screen 520 shown in FIG. 3C displays a list of external apparatuses 200 connected to the image forming apparatus 100, so the user selects an external apparatus 200 he wants by pressing the OK key 115 (step S1003).

In step S1004, the image forming apparatus 100 acquires, from the database 190, information for displaying a list of all profiles corresponding to the external apparatus 200 selected by the user. In this case, profiles corresponding to the external apparatus 200 are acquired by periodically polling the external apparatus 200, and registered in the database 190 in advance. For example, profiles corresponding to the external apparatus 200 may be acquired by periodically polling the external apparatus 200, and registered in the database 190 till step S1003 after the image forming apparatus 100 is turned on.

In step S1005, the image forming apparatus 100 tries to communicate with the external apparatus 200, and determines whether communication with the external apparatus 200 is possible (step S1006). Communication in step S1005 may adopt any method, and may be done by a "ping" command or the like. If the image forming apparatus 100 determines in step S1006 that communication is possible, it displays a list of all profiles corresponding to the selected external apparatus 200 on the display unit 120, as shown in FIG. 3D (step S1007). If the image forming apparatus 100 determines that communication is impossible, it displays an error screen as shown in FIG. 4A, and displays again the screen 520 shown in FIG. 3C to select the external apparatus 200. The image forming apparatus 100 then returns to step S1002 (step S1008).

Figure 6:
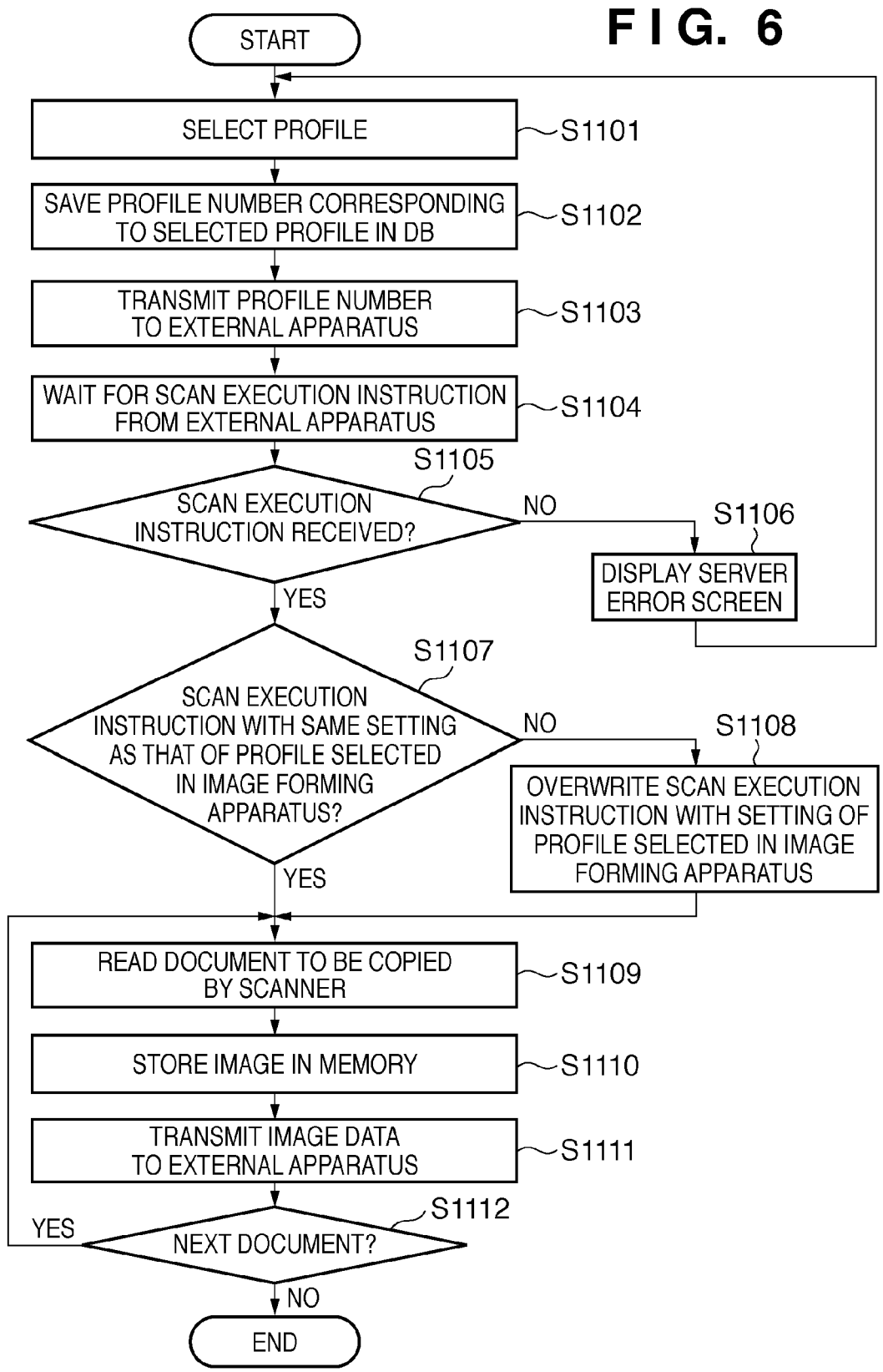
FIG. 6 is a flowchart showing processing until image data is transmitted after a profile is selected.

FIG. 6 is a flowchart showing a processing sequence until the image forming apparatus 100 transmits image data to the external apparatus 200 after the user selects a profile in the image forming apparatus 100. For example, the CPU 101 of the image forming apparatus 100 executes processing shown in this flowchart. In step S1101, the user selects a profile from the profile selection screen 530 by pressing the OK key 115. After selecting the profile, the image forming apparatus 100 executes a job of the extended copy function. In step S1102, the image forming apparatus 100 saves a profile number (identification information for identifying a profile) corresponding to the selected profile in the temporary storage area of the database 190, the RAM, or the like. The saved profile number is used later upon receiving a scan execution instruction from the external apparatus 200.

In step S1103, the image forming apparatus 100 notifies the external apparatus 200 of the profile number corresponding to the selected profile (example of the first transmission). In step S1104, the image forming apparatus 100 waits for a scan execution instruction corresponding to the notified profile number. In step S1105, the image forming apparatus 100 determines whether it has received a scan execution instruction from the external apparatus 200. If the image forming apparatus 100 determines that it has not received a scan execution instruction, it determines that an error has occurred in a server or the like, and displays an error screen (not shown) to this effect (step S1106). If the image forming apparatus 100 determines that it has received a scan execution instruction, it acquires, from the database 190, a profile corresponding to the profile number selected in the image forming apparatus 100 in step S1107. Further, the image forming apparatus 100 determines whether the same mode setting as the mode setting set in the instruction received from the external apparatus 200 is set in the profile acquired from the database 190. If the image forming apparatus 100 determines that the same mode setting is not set, it overwrites the mode setting set in the instruction received from the external apparatus 200 with the mode setting of the profile stored in the database 190 in step S1108. If the image forming apparatus 100 determines that the same mode setting as the mode setting set in the instruction received from the external apparatus 200 is set in the profile acquired from the database 190, it starts executing scanning in the mode setting complying with the scan execution instruction from the external apparatus 200. Note that the same setting mode means not completely coincident settings but at least corresponding settings. For example, when the mode setting includes a plurality of settings regarding image reading, it is not always necessary to determine whether all settings match each other, and it suffices to determine whether at least some specific settings are the same. At this time, the user may determine in advance specific settings to be determined. For example, when the mode settings are the color/black and white mode, reading resolution, and reading size, only the color/black and white mode can be defined as a specific setting to be determined.

In step S1109, the scanning unit 170 reads a document, generating image data. In step S1110, the image processing unit 140 performs image processing for the scanned image data and stores the resultant image data in the memory 150. In step S1111, the image forming apparatus 100 transmits, to the selected external apparatus 200 via the external I/F 160, the image data which has undergone image processing and is stored in the memory 150 (example of the second transmission). In step S1112, the image forming apparatus 100 determines whether the next document exists. If the image forming apparatus 100 determines that the next document exists, it returns to step S1109; if it determines that no next document exists, ends the processing.

Figure 7:
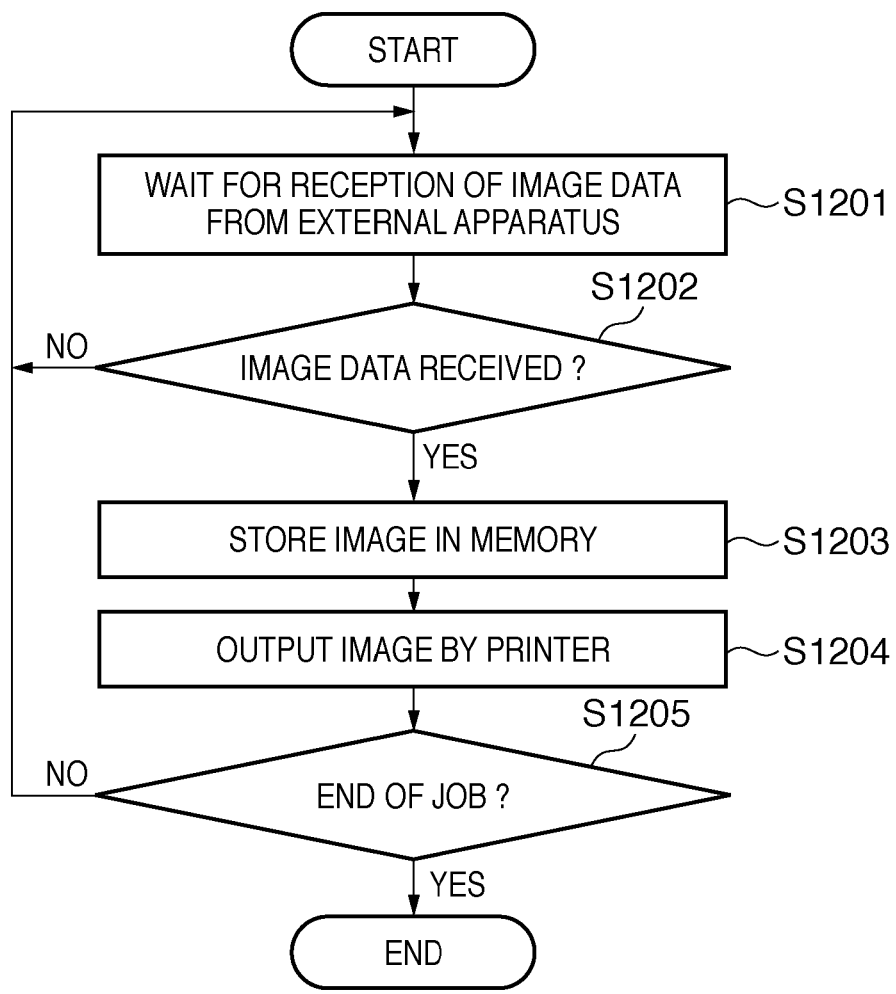
FIG. 7 is a flowchart showing processing until the image forming apparatus receives image data from the external apparatus and prints it.

FIG. 7 is a flowchart showing a processing sequence until the image forming apparatus 100 receives image data from the external apparatus 200 and prints it. For example, the CPU 101 of the image forming apparatus 100 executes processing shown in this flowchart. The received image data has undergone image processing in the external apparatus 200, as needed. First in step S1201, the image forming apparatus 100 waits for reception of image data which has undergone image processing and is transmitted from the external apparatus 200 via the external I/F 160. In step S1202, the image forming apparatus 100 determines whether it has received image data. If the image forming apparatus 100 determines that it has received image data, it advances to step S1203; if it determines that it has not received image data, returns to step S1201. In step S1203, the image forming apparatus 100 stores the received image data in the memory 150. In step S1204, the printing unit 180 performs print processing for the image data stored in the memory 150. In step S1205, the image forming apparatus 100 determines whether all target jobs of the extended copy function have ended. If the image forming apparatus 100 determines that there is a job which has not ended, that is, there is image data which has not been received, it returns to step S1201. If the image forming apparatus 100 determines that all jobs have ended, it ends the processing.

Figure 8:
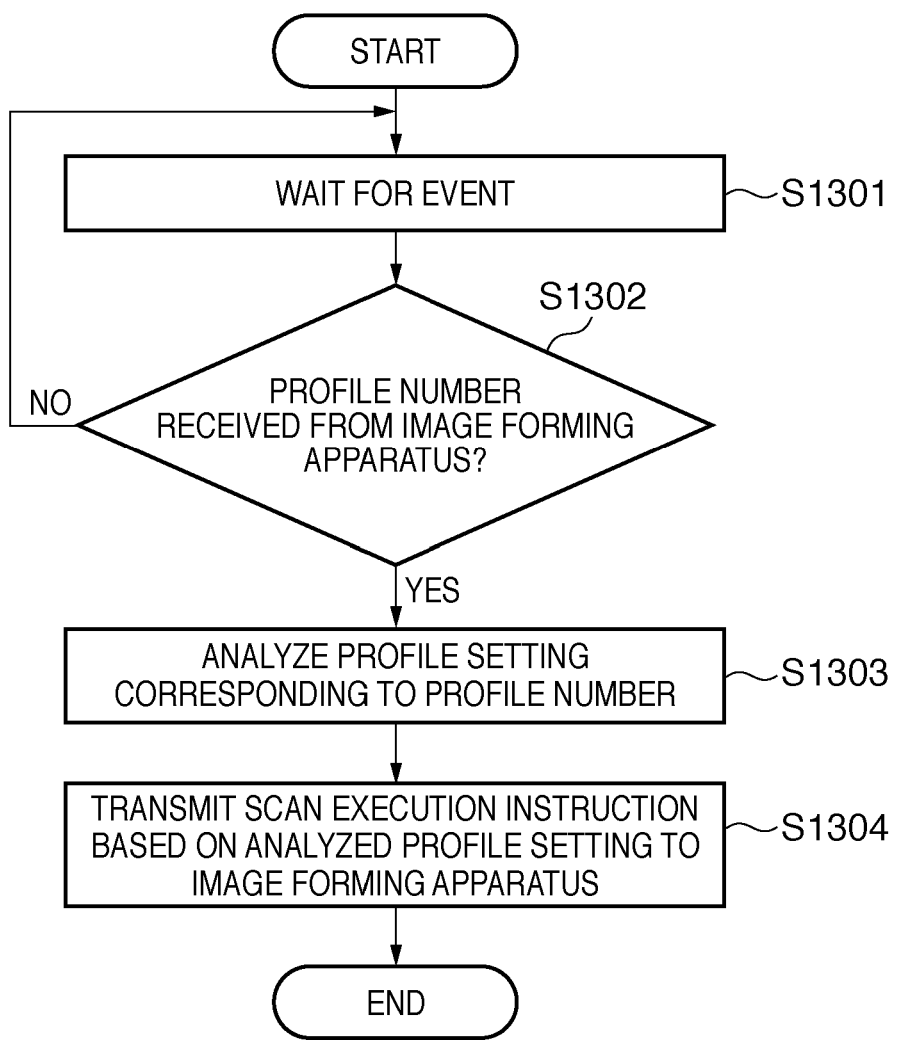
FIG. 8 is a flowchart showing processing when the external apparatus receives a profile number from the image forming apparatus.

FIG. 8 is a flowchart showing a processing sequence when the external apparatus 200 receives a profile number from the image forming apparatus 100. For example, the CPU 201 of the external apparatus 200 executes processing shown in this flowchart. First in step S1301, the external apparatus 200 waits for reception of a profile number from the image forming apparatus 100 (corresponding to step S1103 in FIG. 6). In step S1302, the external apparatus 200 determines whether it has received a profile number from the image forming apparatus 100. If the external apparatus 200 determines that it has not received a profile number, it returns to step S1301. If the external apparatus 200 determines that it has received a profile number, it advances to step S1303. In step S1303, the external apparatus 200 analyzes the setting of a profile corresponding to the profile number received from the image forming apparatus 100 out of profiles stored in the profile database 220. In step S1304, the external apparatus 200 transmits a scan execution instruction based on the analyzed profile setting (mode setting) to the image forming apparatus 100 via the external I/F 160.

Figure 9:
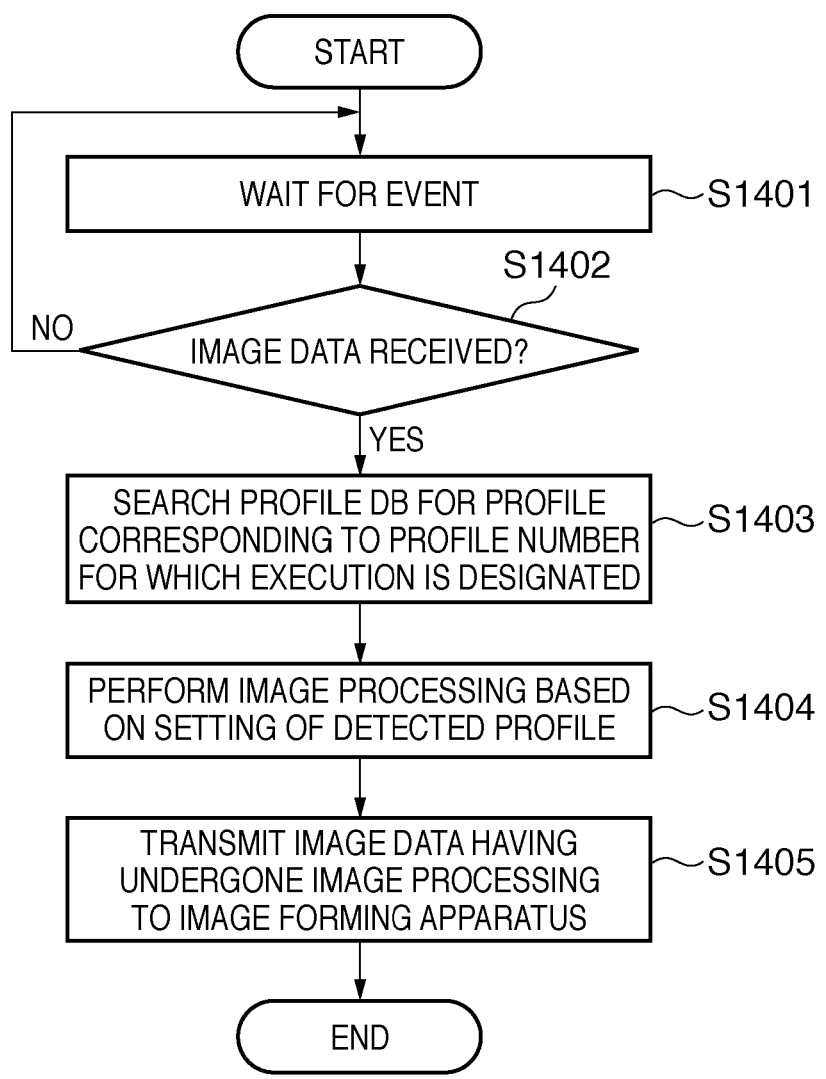
FIG. 9 is a flowchart showing processing when the external apparatus receives image data from the image forming apparatus.

FIG. 9 is a flowchart showing a processing sequence when the external apparatus 200 receives image data from the image forming apparatus 100. For example, the CPU 201 of the external apparatus 200 executes processing shown in this flowchart. First in step S1401, the external apparatus 200 waits for reception of scanned image data from the image forming apparatus 100 (corresponding to step S1111 in FIG. 6). In step S1402, the external apparatus 200 determines whether it has received scanned image data from the image forming apparatus 100. If the external apparatus 200 determines that it has not received scanned image data, it returns to step S1401. If the external apparatus 200 determines that it has received scanned image data, it stores the received image data in the memory 203 in step S1403. Then, the external apparatus 200 searches profiles stored in the profile database 220 for a profile corresponding to the profile number, and analyzes the setting. In step S1404, the external apparatus 200 performs, for the received image data, image processing set in the detected profile. In step S1405, the external apparatus 200 transmits the image data having undergone image processing to the image forming apparatus 100 via the external I/F 160.

As described above, even when the external apparatus transmits a scan execution instruction having a mode setting the user does not intend in executing the extended copy function cooperatively by the external apparatus and image forming apparatus, the image forming apparatus executes scanning by giving priority to the mode setting of a profile selected in the image forming apparatus. This can prevent output of an image the user does not want.

[Second Embodiment]

The second embodiment inhibits rewrite of a profile setting in an external apparatus 200 after a selected profile number is transmitted to the external apparatus 200 in step S1103 of FIG. 6. This processing can prevent the profile setting in an image forming apparatus 100 from differing from that in the external apparatus 200.

Figure 10:
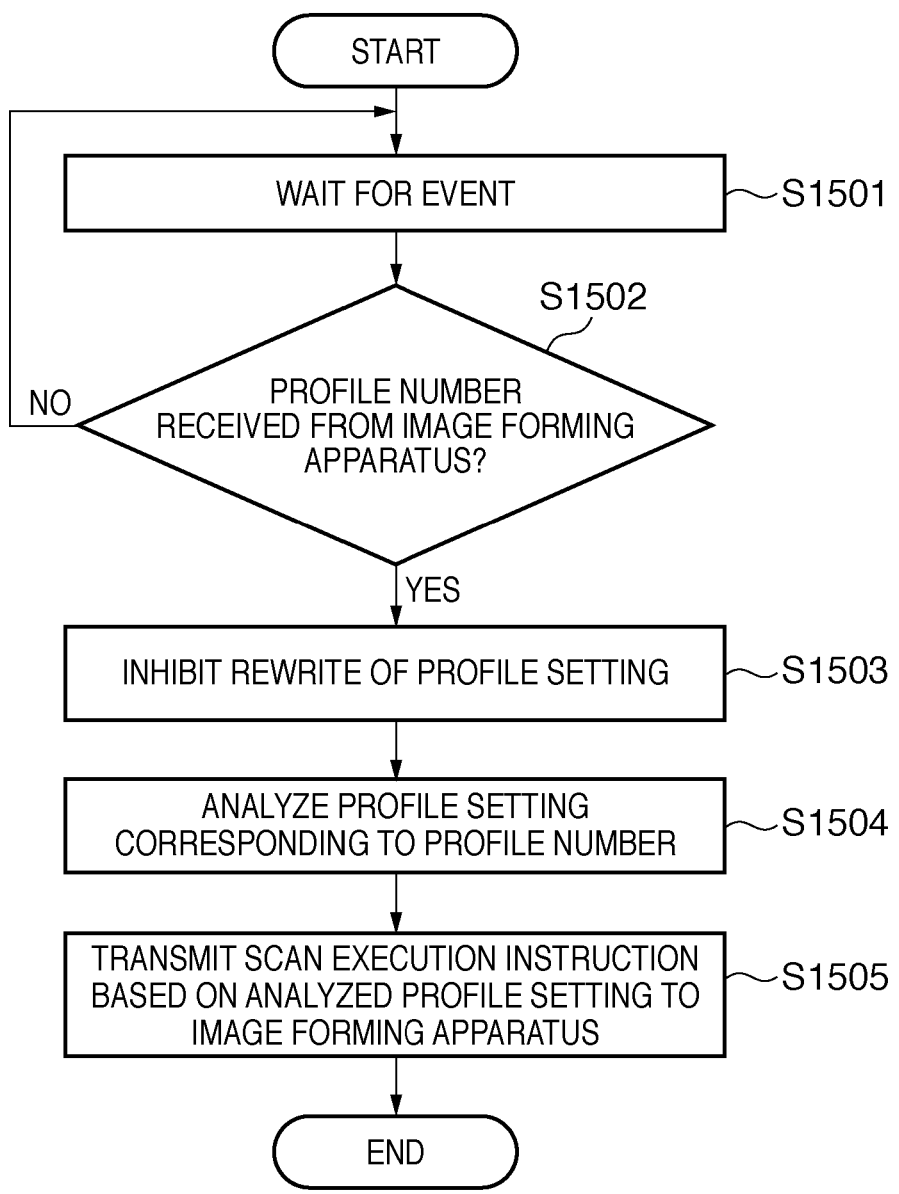
FIG. 10 is a flowchart showing another processing when the external apparatus receives a profile number from the image forming apparatus.

FIG. 10 is a flowchart showing a processing sequence when the external apparatus 200 receives a profile number from the image forming apparatus 100 in the second embodiment. For example, a CPU 201 of the external apparatus 200 executes processing shown in this flowchart. In step S1501, the external apparatus 200 waits for reception of a profile number from the image forming apparatus 100 (corresponding to step S1103 in FIG. 6). In step S1502, the external apparatus 200 determines whether it has received a profile number from the image forming apparatus 100. If the external apparatus 200 determines that it has not received a profile number, it returns to step S1501. If the external apparatus 200 determines that it has received a profile number, it advances to step S1503. In step S1503, the external apparatus 200 inhibits rewrite of a profile setting. In step S1504, the external apparatus 200 analyzes the setting of a profile corresponding to the profile number stored in a profile database 220. In step S1505, the external apparatus 200 transmits a scan execution instruction based on the analyzed profile setting to the image forming apparatus 100 via an external I/F 160.

[Third Embodiment]

The third embodiment is different from the first embodiment in procedures after the processing in step S1107 of FIG. 6.

FIG. 11 is a flowchart showing a processing sequence until an image forming apparatus 100 transmits image data to an external apparatus 200 after the user selects profile information he wants in the third embodiment. In step S1601, when the user selects a profile he wants from a profile selection screen 530 by pressing an OK key 115, the image forming apparatus 100 starts executing a job of the extended copy function. In step S1602, the image forming apparatus 100 saves a profile number corresponding to the selected profile in the temporary storage area of a database 190, the RAM, or the like. The saved profile number is used later upon receiving a scan execution instruction from the external apparatus 200. In step S1603, the image forming apparatus 100 notifies the external apparatus 200 of the profile number corresponding to the selected profile.

In step S1604, the image forming apparatus 100 waits for a scan execution instruction from the external apparatus 200. In step S1605, the image forming apparatus 100 determines whether it has received a scan execution instruction. If the image forming apparatus 100 determines that it has not received a scan execution instruction, it determines that an error has occurred in a server or the like, and displays an error screen to notify the user of a message indicative of this in step S1606. If the image forming apparatus 100 determines that it has received a scan execution instruction, it advances to step S1607. In step S1607, the image forming apparatus 100 acquires, from the database 190, a profile corresponding to the profile number selected in the image forming apparatus 100. Further, the image forming apparatus 100 determines whether the same mode setting as a mode setting set in the instruction received from the external apparatus 200 is set in the profile acquired from the database 190. If the image forming apparatus 100 determines that the same mode setting is not set in the profile acquired from the database 190, it discards the scan execution instruction received from the external apparatus 200 in step S1608. After that, the image forming apparatus 100 displays an error screen shown in FIG. 4B to notify the user that the mode setting of the profile in the external apparatus 200 differs from that in the image forming apparatus 100. The image forming apparatus 100 then ends the processing. If the image forming apparatus 100 determines that the same mode setting is set in the profile acquired from the database 190, it starts executing scanning in the mode setting complying with the scan execution instruction from the external apparatus 200. Processes in steps S1609 to S1612 are the same as those in steps S1109 to S1112 of FIG. 6.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-079441, filed Mar. 30, 2010, which is hereby incorporated by reference herein in its entirety.

What is claimed is:

1. An image forming apparatus which is capable of connecting to an information processing apparatus that stores a database for storing a plurality of profiles each specifying a scan setting for reading a document to generate image data and can change the plurality of profiles, the image forming apparatus comprising:
   a reading unit configured to read the document to generate the image data in accordance with a scan instruction for reading the document to generate the image data from the information processing apparatus;
   a first storage unit configured to acquire and store information indicating each of the plurality of profiles;
   a selection unit configured to select one profile based on the information stored in said first storage unit;
   a first transmission unit configured to transmit, to the information processing apparatus, identification information for identifying the profile selected by said selection unit;
   a reception unit configured to receive, from the information processing apparatus, the scan instruction that indicates the scan setting specified by the profile identified based on the identification information;
   a determination unit configured to determine whether the scan setting indicated by the scan instruction received by said reception unit and a scan setting specified by said one profile selected by said selection unit correspond to each other based on the information stored in said first storage unit; and
   a control unit configured to, in a case where said determination unit determines that both settings do not correspond to each other, read the document to generate the image data in accordance with the scan setting specified by said one profile selected by said selection unit, and not to read the document to generate the image data in accordance with the scan setting indicated by the scan instruction received by said reception unit.

2. The apparatus according to claim 1, further comprising a change unit configured to, in a case where said determination unit determines that both settings do not correspond to each other, change the scan setting indicated by the scan instruction received by said reception unit to the scan setting specified by said one profile selected by said selection unit, wherein said reading unit reads the document to generate the image data in accordance with the scan setting changed by said change unit.

3. The apparatus according to claim 1, wherein the scan setting includes information indicating whether to read the image in a color mode or read the image in a black and white mode.

4. The apparatus according to claim 3, wherein
   the information processing apparatus is an information processing apparatus which stores image data generated by the image forming apparatus, transmits the image data to the image forming apparatus, and designates printing based on the image data, and
   the image forming apparatus further comprises:
      a second transmission unit configured to transmit the image data read generated by said reading unit to the information processing apparatus; and
      a printing unit configured to perform print processing for the image data transmitted from the information processing apparatus in accordance with a print instruction from the information processing apparatus.

5. A non-transitory computer-readable storage medium storing a program for causing a computer capable of connecting to an information processing apparatus that stores a plurality of profiles each specifying a scan setting for reading a document to generate image data and can change the plurality of profiles, to function to
   read the document to generate the image data in accordance with a scan instruction for reading the document to generate the image data from the information processing apparatus;
   acquire and store information indicating each of the plurality of profiles;
   select one profile based on the stored information;
   transmit, to the information processing apparatus, identification information for identifying the selected profile;
   receive, from the information processing apparatus, the scan instruction that indicates the scan setting specified by the profile identified based on the identification information;
   determine whether the scan setting indicated by the received scan instruction and a scan setting specified by the one selected profile correspond to each other based on the stored information; and
   in a case where both settings are determined not to correspond to each other, notify a user that the scan setting indicated by the received scan instruction and the scan setting specified by the one selected profile do not correspond to each other.

6. An image forming apparatus control method executed in an image forming apparatus which is capable of connecting to an information processing apparatus that stores a plurality of profiles each specifying a scan setting for reading a document to generate image data and can change the plurality of profiles, the method comprising:
   a reading step of reading the document to generate the image data in accordance with a scan instruction for reading the document to generate the image data from the information processing apparatus;
   a first storage step of acquiring and storing the information indicating each of the plurality of profiles;
   a selection step of selecting one profile based on the information stored in the first storage step;
   a first transmission step of transmitting, to the information processing apparatus, identification information for identifying the profile selected in the selection step;
   a reception step of receiving, from the information processing apparatus, the scan instruction that indicates the scan setting specified by the profile identified based on the identification information;

a determination step of determining whether the scan setting indicated by the scan instruction received in said reception step and a scan setting the one profile selected in said selection step correspond to each other based on the information stored in said first storage step; and a control step of, in a case where both settings are determined in the determination step not to correspond to each other, reading the document to generate the image data in accordance with the scan setting specified by the one profile selected in said selection step, and not to read the document to generate the image data in accordance with the scan setting indicated by the scan instruction received in said reception step.

7. An image forming apparatus control method executed in an image forming apparatus which is capable of connecting to an information processing apparatus that stores a plurality of profiles each specifying a scan setting for reading a document to generate image data and can change the plurality of profiles, the method comprising:

a reading step of reading the document to generate the image data in accordance with a scan instruction for reading the document to generate the image data from the information processing apparatus;

a first storage step of acquiring and storing information indicating each of the plurality of profiles;

a selection step of selecting one profile based on the information stored in the first storage step;

a first transmission step of causing a first transmission unit of the image forming apparatus to transmit, to the information processing apparatus, identification information for identifying the profile selected in the selection step;

a reception step of receiving, from the information processing apparatus, the scan instruction that indicates the scan setting specified by the profile identified based on the identification information;

a determination step of determining whether the scan setting indicated by the scan instruction received in the reception step and a scan setting specified by the one profile selected in said selection step correspond to each other based on the information stored in said first storage step; and a notification step of, in a case where both settings are determined in said determination step not to correspond to each other, notifying a user that the scan setting indicated by the scan instruction received in said reception step and the scan setting specified by the one profile selected in said selection step do not correspond to each other.

8. A non-transitory computer-readable storage medium storing a program for causing a computer capable of connecting to an information processing apparatus that stores a plurality of profiles each specifying a scan setting for reading a document to generate image data and can change the plurality of profiles, to function to read the document to generate the image data in accordance with a scan instruction for reading the document to generate the image data from the information processing apparatus;

acquire and store information indicating each of the plurality of profiles;

select one profile based on the stored information;

transmit, to the information processing apparatus, identification information for identifying the selected profile;

receive, from the information processing apparatus, the scan instruction that indicates the scan setting specified by the profile identified based on the identification information;

determine whether the scan setting indicated by the received scan instruction and a scan setting specified by the one selected profile correspond to each other based on the stored information; and in a case where both settings are determined not to correspond to each other, change the scan setting indicated by the received instruction to the scan setting specified by the one selected profile.

9. An image forming apparatus which is capable of connecting to an information processing apparatus that stores a plurality of profiles each specifying a scan setting for reading a document to generate image data and can change the plurality of profiles, the image forming apparatus comprising:

a reading unit configured to read the document to generate the image data in accordance with a scan instruction for reading the document to generate the image data from the information processing apparatus;

a first storage unit configured to acquire and store information indicating each of the plurality of profiles;

a selection unit configured to select one profile based on the information stored in said first storage unit;

a first transmission unit configured to transmit, to the information processing apparatus, identification information for identifying the profile selected by said selection unit;

a reception unit configured to receive, from the information processing apparatus, the scan instruction that indicates the scan setting specified by the profile identified based on the identification information;

a determination unit configured to determine whether the scan setting indicated by the scan instruction received by said reception unit and a scan setting specified by said one profile selected by said selection unit correspond to each other based on the information stored in said first storage unit; and a notification unit configured to, in a case where said determination unit determines that both settings do not correspond to each other, notify a user that the scan setting indicated by the scan instruction received by said reception unit and the scan setting specified by said one profile selected by said selection unit do not correspond to each other.

10. The apparatus according to claim 9, wherein the scan setting includes information indicating whether to read the image in a color mode or read the image in a black and white mode.

11. The apparatus according to claim 10, wherein the information processing apparatus stores image data generated by the image forming apparatus, transmits the image data to the image forming apparatus, and designates printing based on the image data, and the image forming apparatus further comprises:

a second transmission unit configured to transmit the image data generated by said reading unit to the information processing apparatus; and a printing unit configured to perform print processing for the image data transmitted from the information processing apparatus in accordance with a print instruction from the information processing apparatus.

* * * * *